US007840080B1

(12) United States Patent
Lee

(10) Patent No.: US 7,840,080 B1
(45) Date of Patent: Nov. 23, 2010

(54) MOTION ESTIMATOR ARCHITECTURE FOR LOW BIT RATE IMAGE COMMUNICATION

(75) Inventor: Young Su Lee, Seoul (KR)

(73) Assignee: C & S Technology Co., Ltd., Seoul (KR)

( * ) Notice: Subject to any disclaimer, the term of this patent is extended or adjusted under 35 U.S.C. 154(b) by 0 days.

(21) Appl. No.: 09/657,573

(22) Filed: Sep. 8, 2000

(30) Foreign Application Priority Data

Jul. 21, 2000    (KR) .......................... 10-2000-42044

(51) Int. Cl.
 *G06K 9/46* (2006.01)
(52) U.S. Cl. .................... 382/236; 382/107; 348/402.1; 375/240.17
(58) Field of Classification Search ................. 382/233, 382/232, 107, 234, 235, 236, 237, 238, 244, 382/245, 246, 247, 250, 252, 253, 100; 708/401, 708/402, 403; 348/384.1, 408.1, 440.1, 699; 358/426.01, 426.016; 375/240.19, 240.16, 375/240.14, 240.17
See application file for complete search history.

(56) References Cited

U.S. PATENT DOCUMENTS 5,614,959 A  *  3/1997  Jeong et al. .................. 348/699
5,973,742 A  * 10/1999  Gardyne et al. ........ 375/240.15
6,198,772 B1 *  3/2001  Boice et al. ............. 375/240.17
6,205,177 B1 *  3/2001  Girod et al. ............. 375/240.14
6,249,318 B1 *  6/2001  Girod et al. ............. 375/240.16
6,295,546 B1 *  9/2001  Adiletta ....................... 708/402
6,310,962 B1 * 10/2001  Chung et al. ................. 382/100
6,373,895 B2 *  4/2002  Saunders et al. ....... 375/240.19

* cited by examiner

*Primary Examiner*—Timothy M. Johnson
*Assistant Examiner*—Seyed D. Azarian
(74) *Attorney, Agent, or Firm*—Bacon & Thomas, PLLC

(57) ABSTRACT

An adaptable motion estimator architecture for low bit rate image communication 1) to be compatible with image characteristic and bit rate with a reduced hardware size and 2) to optimize performance of the motion estimator by selectively applying a search method suitable for a low bit rate image characteristic and an encoder performance.

The motion estimator multiplexes a previous search window memory data from DRAM and a current macro block data for finding motion vectors to conform to each data processing elements (PE0-PE8) and comparatively detecting MAE (Mean Absolute Error) of each motion vector with a previous frame data and a current frame data to find a motion vector having a least MAE.

The motion estimator may be applied to an image phone which requires high encoding efficiency due to small hardware and may be applied to all video encoders conforming to H.261/H.263 and MPEG.

6 Claims, 10 Drawing Sheets

MOTION ESTIMATOR ARCHITECTURE FOR LOW BIT RATE IMAGE COMMUNICATION

BACKGROUND OF THE INVENTION

1. Technical Field

The present invention relates to an adaptable motion estimator architecture for low bit rate image communication. Particularly, the present invention relates to a technique to implement a motion estimator which has a reduced size of hardware and is compatible with characteristics and a bit rate of an applied image.

2. Description of the Prior Art

Generally, an image data compression/decompression technique is an essential one used in various fields such as multimedia communication, broadcast, storing media, etc. There are several standards for the image data compression/decompression such as JPEG (Joint Photographic Experts Group), MPEG (Moving Picture Experts Group), H.261/H.263, etc. Among them, H.261/H.263 is broadly used for low bit rate image communication.

Particularly, there are two methods of compressing the moving pictures: spatial compression and time compression. The spatial compression mainly employs DCT (Discrete Cosine Transform), Huffman Coding, DPCM (Differential Pulse Code Modulation), RLC (Run Length Coding), and so on. The time compression mainly uses Motion Estimation.

The motion estimation enhances the bit rate by obtaining a moving vector corresponding to a position with the least difference in a given search area of a previous frame to send a 16×16 macro block of a current frame by using a time relation between the previous frame and the current frame. The motion estimation is used in all encoders to which MPEG and H.261/H.263 standards are applied.

FIG. 1 is a schematic view for illustrating concept of a macro block in the current frame.

As shown in FIG. 1, a size of the macro block in the current frame is indicated in 16 pixels×16 pixels by the MPEG and H.261/H.263 standards and defined as a macro block 10.

In case of a CIF (Common Interchange Format) having a current frame size of 352 pixels×288 pixels, 396 macro blocks 10 exists in each frame and 396 times of motion estimations are needed.

In case of ¼ CIF (Quarter CIF; hereinafter referred as QCIF) having a current frame size of 176 pixels×144 pixels, it can be understood that 99 times of motion estimations are needed in one frame.

FIG. 2 is a schematic view for illustrating concept of a search window and a motion vector.

As shown in FIG. 2, the current macro block 10 in a current frame moves in a pixel unit on a search area of a previous frame and finds a macro block having a least difference.

At this time, a position of the current macro block 10 and a position of a best match block 20 are indicated as a motion vector 30 on the previous frame.

Computational complexity and memory bandwidth of the motion estimator may estimate motion as shown in FIG. 2 when using a full search method, which is a representative motion estimating method.

Of course, provided that a size of the macro block is 16 pixels×16 pixels and a distance of the search window is 8, the numbers of available vectors are −8~+8 at X-axis and −8~+8 at Y-axis. Also, 289 times of comparisons are required for 17 pixel×17 pixel macro blocks.

In order to find out the most similar macro block 10 among the 289 motion vectors, MAE (Mean Absolute Error) is mainly used and a value corresponding to a least MAE is determined as the motion vector 30.

MAE is obtained by adding an absolute value of a difference between a current pixel and a previous pixel, which is identical to a value adding an absolute value of a 16 pixel×16 pixel difference.

In other word, because there are all 99 macro blocks in QCIF and MAE requires 289 calculations for each block, about 99×289 (28,611) times of MAE calculations are needed in one frame.

In fact, MAE calculations are performed less than 28,611 times. Because the search area is limited for macro blocks in a frame boundary, 23,427 times of macro block comparisons are needed in consideration of the boundary.

Such motion estimation requires much computational complexity and very large memory bandwidth, which make it difficult to implement such technique into hardware.

The previous frame data and the current frame data are generally stored in DRAM (Dynamic Random Access Memory). The reason is that there is quite a large amount of the frame data. For example, about one MEGA bit memory is required to store one frame of CIF.

In addition, in order to access a comparison macro block data of the previous frame from DRAM whenever comparing the macro blocks, a very large memory bandwidth is needed.

As shown in FIG. 2, in case of QCIF, an image format and a moving picture of 15 frames per second, 23,427×16×16×15 bytes/second (about 90 Mbytes/second) of memory bandwidth is required. Due to such big memory access, a high speed SRAM (Static RAM) is usually used as a cache memory.

FIG. 3 shows a half-pixel position and its formula among the moving vectors of FIG. 2.

As shown in FIG. 3, capital letter A, B, C and D points indicate integer-pixel positions, while small letter a, b, c and d points indicate half-pixel positions. In the figure, it can be seen that there exist integer-pixel vectors and half-pixel vectors in the motion vector.

$$a=A$$

$$b=(A+B+1)/2$$

$$c=(A+C+1)/2$$

$$d=(A+B+C+D+2)/2 \qquad \text{Formula 1}$$

Therefore, motion of the half-pixel position can be estimated by the above Formula 1 using each of the integer-pixels and the half-pixels.

However, such conventional motion estimation has some problems described below.

First, the conventional motion estimation requires a large amount of computational complexity. Though a faster search algorithm such as a hierarchy search, a three step search, a sub-sampling search, etc. is announced to reduce the computational complexity, such search methods have difficulties in hardware applications. Therefore, the full search algorithm is mainly used.

Second, as a hardware structure for the full search, a systolic array is usually used. However, the systolic array has a drawback that it may increase a size of hardware and a load of synchronous clocks due to abundant registers for pipelines.

Third, in case of using the systolic array, a half-pixel function can be hardly included in an integer-pixel function. So, a separate hardware for the half-pixel function is needed.

SUMMARY OF THE INVENTION

Therefore, the present invention is designed to solve the problems of the prior art. An object of the present invention is to provide a motion estimation architecture for low bit rate image communication which may decrease a hardware size, and be compatible with image characteristic and bit rate.

Another object of the present invention is to provide a motion estimation architecture for low bit rate image communication which optimizes performance of the motion estimator by selectively applying a search method suitable for a low bit rate image characteristic and an encoder performance.

In order to accomplish the above object, the present invention provides a motion estimator architecture for low bit rate communication, which includes a previous frame storing unit for storing a previous search window data of a current macro block from a previous frame memory. A current frame storing unit stores a current macro block data to find a motion vector in a current frame memory. A multiplexer multiplexes the previous search window data and the current macro block data to conform to data processing thereof. A data process unit having a plurality of processing elements calculates a mean absolute error (MAE) of the motion vector with the previous search window data and the current macro block data transmitted from the multiplexer. A comparing unit comparatively detects the MAE of each motion vector from the data process unit to detect a motion vector having a least MAE. A state controller controls data flows between the above components.

In another embodiment of the present invention, the motion estimator may estimate the motion vector using any of a full search method and an interlace search method according to image characteristics and a bit rate.

In another embodiment of the present invention, the motion estimator may estimate a final motion vector by searching −8~+8 integer-pixels to X and Y-axes to obtain an integer-pixel motion vector and then searching 9 half-pixels including the integer-pixel motion vector.

In another embodiment of the present invention, the motion estimator may calculate a half-pixel motion vector by searching 9 integer-pixels and 3 half-pixels at the same time using 9 processing elements (PE) when searching the half-pixels.

In another embodiment of the present invention, the motion estimator may detect the motion vector by searching both integer-pixels and half-pixels at the same time.

In another embodiment of the present invention, the motion estimator may update data which is not overlapped with the previous search window data when bringing the search window data of the current macro block from the previous frame storing unit.

In another embodiment of the present invention, the motion estimator may calculate addresses differently depending on the fact that number of the update macro block is even or odd when estimating motion of the current macro block.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE PREFERRED EMBODIMENT

Hereinafter, preferred embodiments of the present invention will be described in detail with reference to the accompanying drawings.

Figure 4:
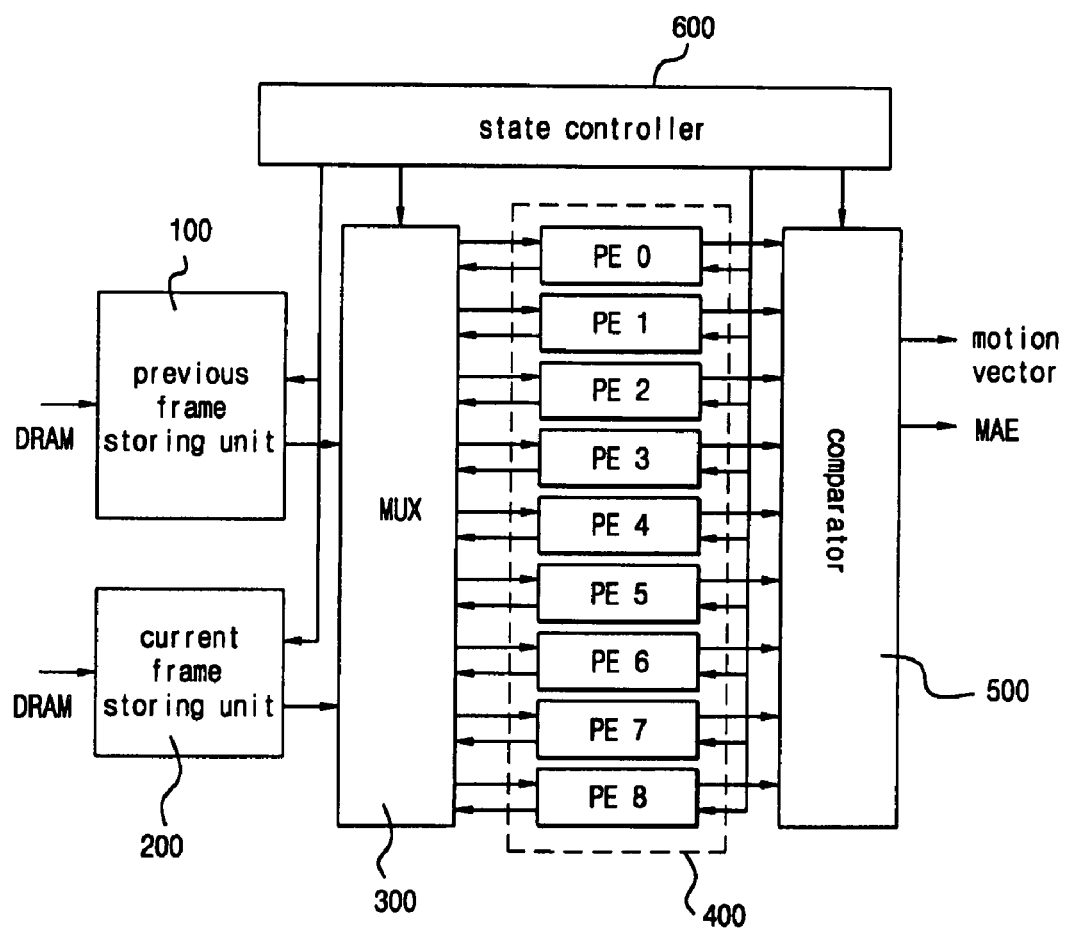
FIG. 4 is a block diagram for illustrating architecture of a motion estimator according to the present invention.

FIG. 4 is a block diagram for illustrating architecture of a motion estimator according to the present invention.

Referring to FIG. 4, the motion estimator includes a previous frame storing unit 100 for storing a previous search window data of a current macro block from a previous frame memory, a current frame storing unit 200 for storing a current macro block data to find a motion vector in a current frame memory, a multiplexer 300 for multiplexing the previous search window data and the current macro block data to conform to operation of each data processor, a data process unit 400 for calculating a mean absolute error (MAE) of the motion vector with the previous search window data and the current macro block data transmitted from the multiplexer 300, a comparator 500 for comparatively detecting the MAE of each motion vector from the data process unit 400 to detect a motion vector having a least MAE, and a state controller 600 for controlling data flows between the above components.

The motion estimation applied to the present invention is a method of compressing moving pictures by using a relation between moving picture frames. The method employs a technique to find a movement degree of a certain block of the current frame on a search area of the previous frame and then encoding and sending a difference value between a pixel data and a motion vector having a least difference.

The previous frame storing unit 100 stores the search window data of the current macro block among the previous frame data, which has a memory size as suggested in Formula 2.

$$(PC_{mb} + (SD \times 2))^2 \times 8 \text{ bits} \qquad \text{Formula 2}$$

where $PC_{mb}$ is a macro block pixel count and SD is a search length.

In other word, if the search length is 8 in a 16×16 macro block, the memory size is $(16+(8\times2))^2 \times 8 = 1024 \times 8$ bits.

Therefore, in consideration of the motion estimation, a suitable output data width of the memory is 32 and the memory size can be inscribed as 256×32.

The current frame storing unit 200 stores the current macro block data to find the motion vector among the current frame data. A memory size of the current macro block is suggested in Formula 3.

$$PC_{mb}^2 \times 8 \text{ bits} \qquad \text{Formula 3}$$

where $PC_{mb}$ is a macro block pixel count and 256×8 bits.

In other word, if the data width is 8, the memory size can be inscribed as 64×32 bit memory.

The data process unit 400 which calculates MAE of each motion vector with the previous frame data and the current frame data transmitted from the multiplexer 300 has 9 processing elements (PEs).

With use of the 9 processing elements, the data process unit 400 can calculate 9 motion vectors at the same time. There are three reasons that the data process unit 400 uses 9 PEs.

First, it may reduce a chip area. The systolic array needs 256 PEs, so requiring so big area. The 9 PEs are suitable for estimating motion of QCIF, mainly used for low bit rate image communication, as well as CIF.

Second, it ensures regular operation. If the search length is 8, there are 17 kinds of X-axis vectors in numbers of −8 to +8. There are also 9 X-axis vectors in right and left borders in numbers of −8 to 0, 0 to +8.

If using 8 PEs, the data process unit 400 may calculate 8 vectors at once. Therefore, in order to calculate 9 kinds of X-axis vectors in numbers of −8 to 0, the data process unit 400 should perform operation for X-axis vectors in numbers of −8 to −1 first, and then another operation for 0.

Moreover, if calculating 17 kinds of vectors in numbers of −8 to 8 with the 9 PEs, the data process unit 400 calculates vectors in numbers of −8 to 0 first, and then in numbers of 0 to +8, so duplicating calculation for the number 0 vector. It ensures easy control and effective motion estimation.

Third, the 9 PEs ensure motion estimation of the half-pixel vector without any separate hardware.

In other word, 4 integer-pixel position points A, B, C, D are required to obtain a value of a half-pixel position (d) and the data process unit may calculate a value of the half-pixel with use of such points.

Figure 5A:
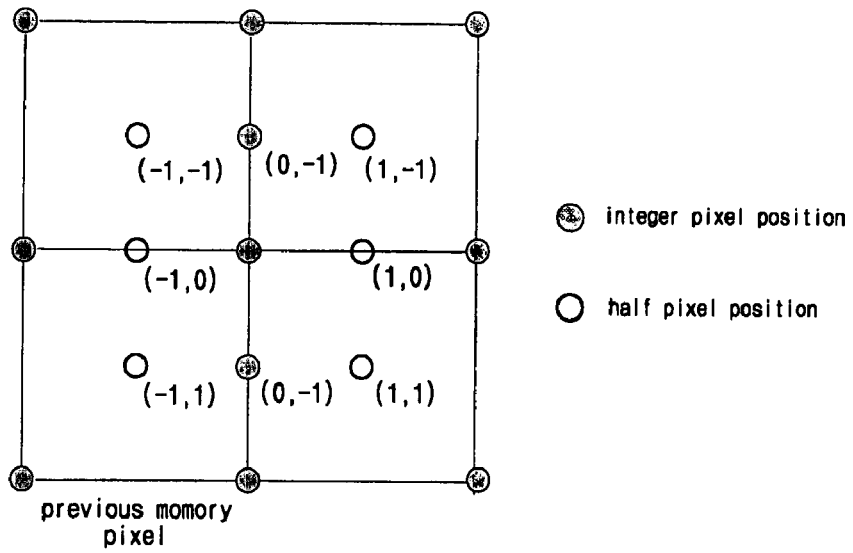
FIGS. 5a and 5b are for illustrating a half-pixel search process of the present invention.
Figure 5B:
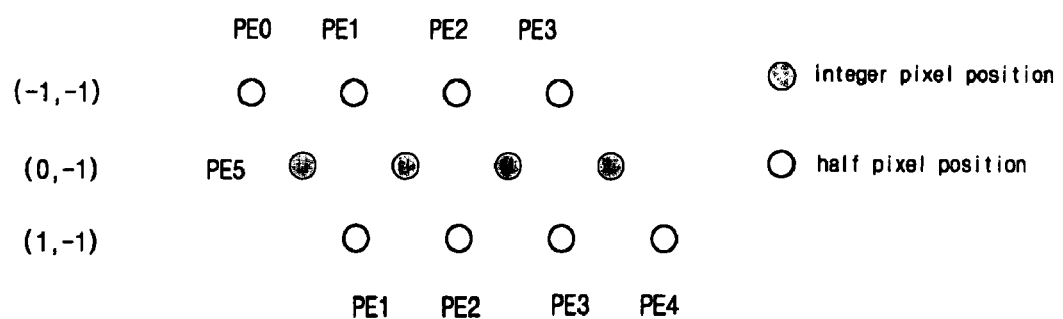

FIGS. 5a and 5b are for illustrating a half-pixel search method according to the present invention.

As shown in FIGS. 5a and 5b, processing elements (PE0-PE4) calculate five half-pixels in X and Y-axes and PE5 calculate a half-pixel in Y-axis.

The calculated half-pixels are inputted to PE6-PE8 to calculate the three half-pixels at the same time.

The half-pixel search method calculates vectors of neighbor nine half-pixels including the motion vector obtained in an integer-pixel search. Because the data process unit may calculate three half-pixel vector with the 9 PEs, motion vectors of all half-pixels can be obtained with three calculations.

Figure 6A:
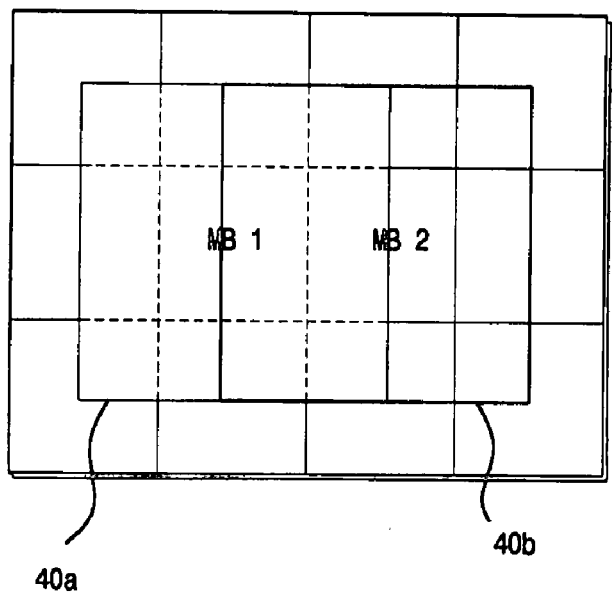
FIGS. 6a and 6b are for illustrating a memory accessing method of the search window according to the present invention.
Figure 6B:
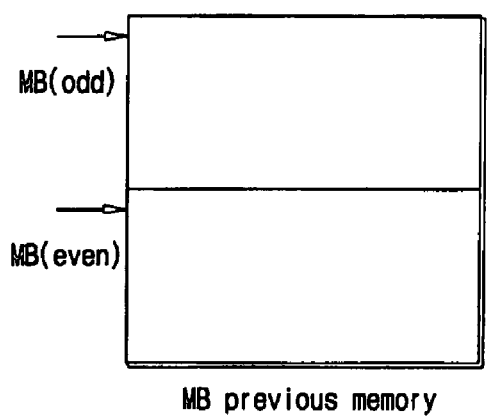

FIGS. 6a and 6b are for illustrating a memory access method of the search window according to the present invention.

As shown in FIGS. 6a and 6b, they show an efficient memory access method when bringing the previous image data in an external DRAM to memories of search windows 40a, 40b.

When estimating motion of the current macro block, the memory access method uses a phenomenon that the current macro block is overlapped with the search window 40b which the previous macro block has used among data to be brought to a memory of the search window 40a from the external DRAM.

In other words, when estimating motion of the macro blocks each time, the method does not bring all of the previous image data in all search area but brings new data, now overlapped with the previous data. Therefore, the method may solve an address control problem by differently calculating an address according to the fact that the macro block has an even number or an odd number.

In addition, such method may reduce access time related to the external DRAM. The motion estimator suggested by the present invention is designed to select the full search or the interlace search according to image characteristics and encoder performance.

Figure 7A:
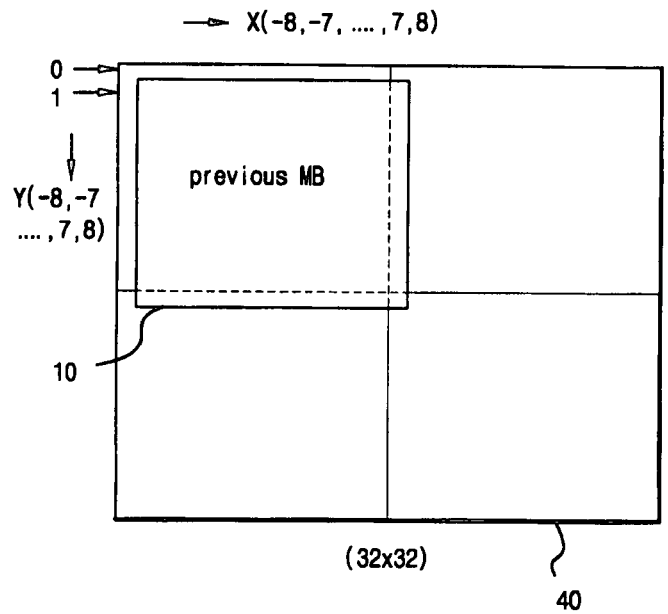
FIGS. 7a and 7b, are for illustrating a full search method and an interlace search method according to the present invention.
Figure 7B:
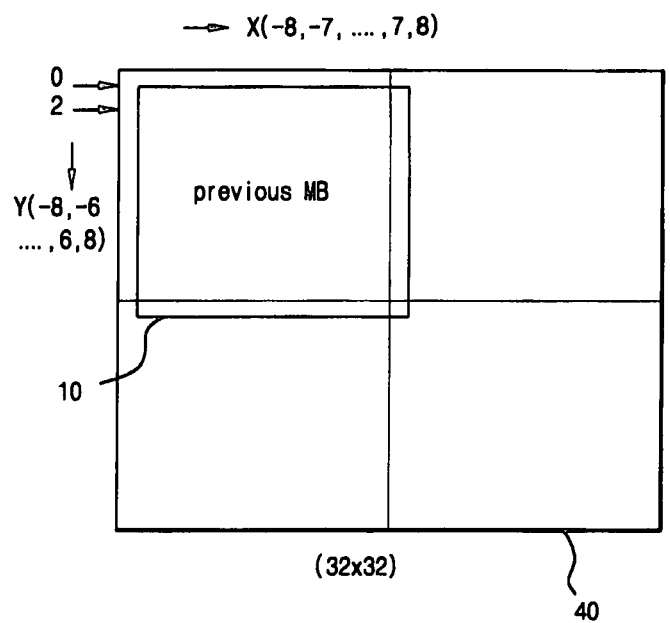

FIGS. 7a and 7b are for illustrating the full search and the interlace search according to the present invention.

FIGS. 7a and 7b respectively show the full search and the interlace search. The full search may calculate the most accurate motion vector because it calculates motion vectors in all search area.

However, because of performing the motion estimation for all vectors, the full search may deteriorate encoder performance due to increased computational complexity in case that a speed of the motion estimation determines a speed of the encoder.

Therefore, there is a need to increase proportion of encoding frames by efficient motion estimation suitable for the image characteristics. There is also a fast search algorithm to decrease computational complexity of the motion estimation. However, the fast search algorithm has disadvantages that it has difficulties to implement in hardware and it could not find as accurate motion vector as the full search.

The present invention performs the full search to find more accurate motion vector in case that the encoding frame proportion is low or in case of compressing a small image such as QCIF format, while performing the interlace search to find the motion vector rapid in case that the encoding frame proportion is high and in case of compressing images bigger than CIF format.

A function of selecting the full search and the interlace search according to encoder performance is programmed. The reason of using the interlace search for rapid search is that the interlace search uses same hardware structure as the full search.

When enhancing accuracy of searching the motion vector, it is not preferable to use only the interlace search. In order to improve the search accuracy, the present invention calculates motion vectors with the interlace search first and then continues the searching operation by ±1 along Y-axis to calculate motion vectors again. Then, the present invention finally calculates motion vectors by searching 9 half-pixel vectors, so increasing accuracy.

Figure 8:
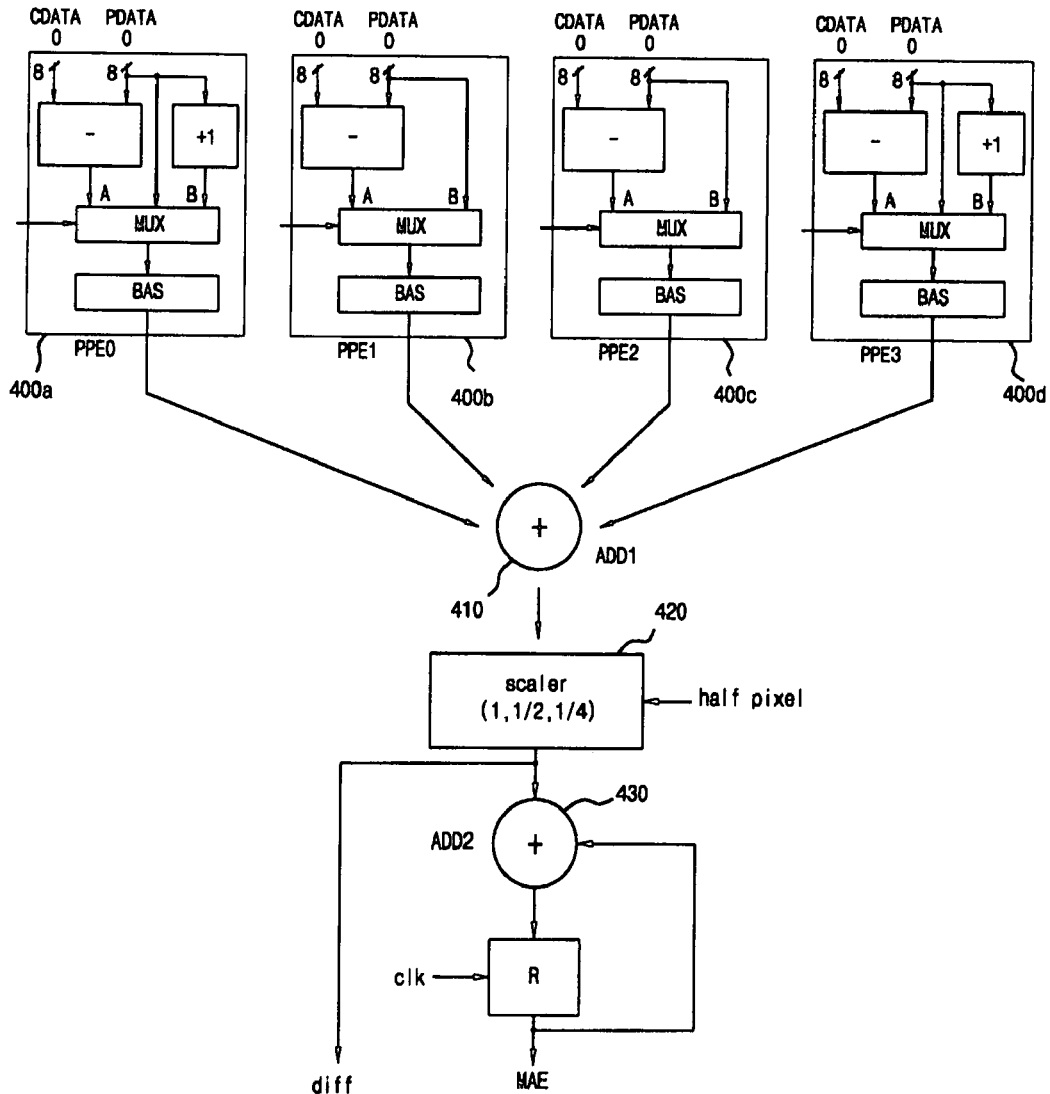
FIG. 8 is a block diagram showing a configuration of first, second, third, fourth and fifth data processing elements (PE018 PE4) of FIG. 4 in detail.
Figure 9:
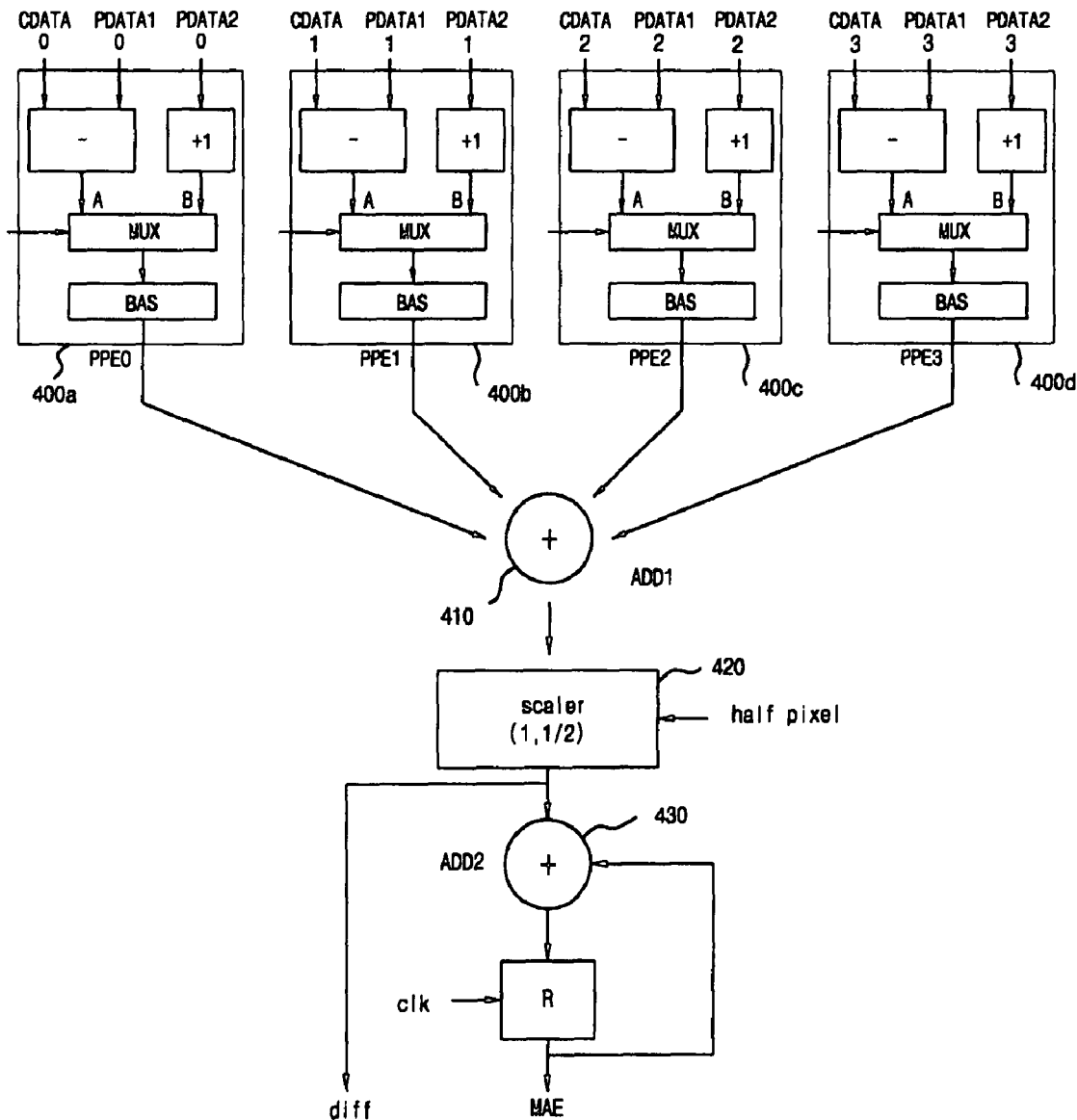
FIG. 9 is a block diagram showing a configuration of a sixth data processing element PE5 of FIG. 4 in detail.
Figure 10:
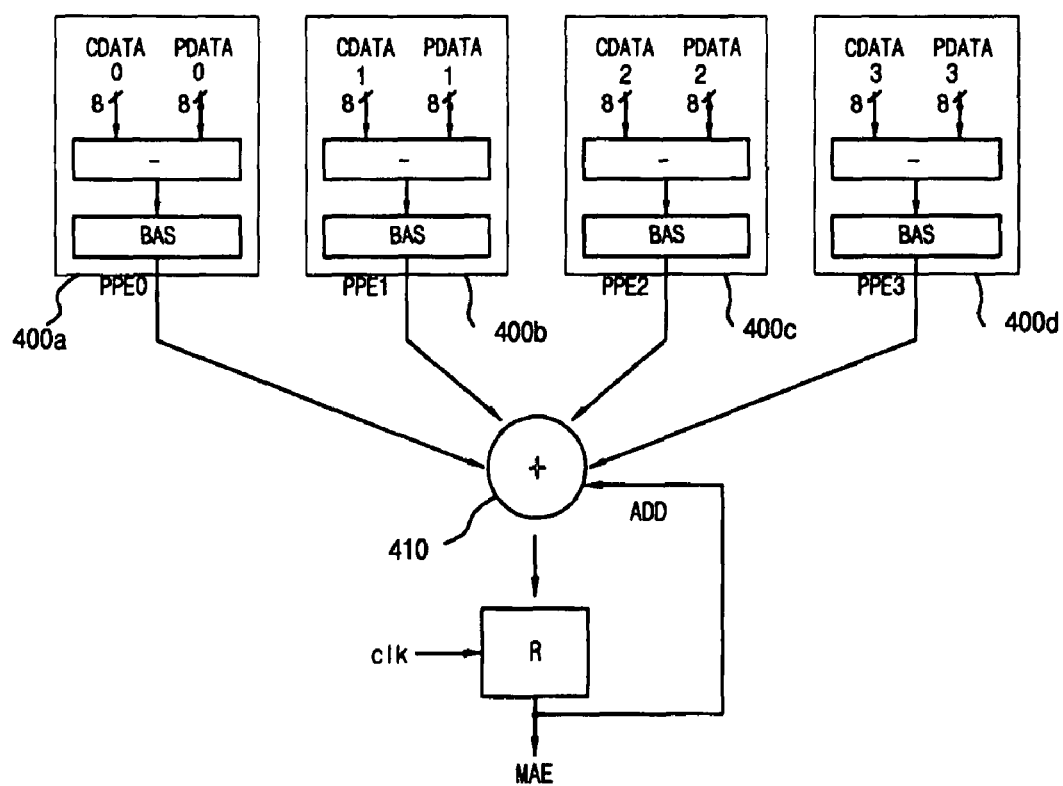
FIG. 10 is a block diagram showing seventh, eighth and ninth data processing elements PE6~PE8 of FIG. 4 in detail.

FIGS. 8 to 10 show block diagram showing the first to ninth data processors, or processing elements (PE0-PE8) of FIG. 4 in detail.

At first, the first to fifth processing elements (PE0-PE4) shown in FIG. 8 includes four present processing elements (PPE0-PPE4) 400a, 400b, 400c, 400d to which current pixel position data (CDATA) and previous pixel position data (PDATA) are transmitted through the multiplexer (MUX) by a Bit-rate Allocation Signal (BAS), a first adder (ADD1) 410, a scaler 420 and a second adder 430.

Because the first to fifth processing elements (PE0-PE4) have 32 bits of memory bus width, 4 pixels can be brought at once from the memory. Therefore, each processing element (PE) is designed to calculate 4 pixels.

A basic operation of the processing elements (PE0-PE4) is to calculate a pixel data difference of a present pixel position corresponding to a previous pixel position and then store the difference value in an accumulator.

Now, operations of the above components are described below in more detail.

The multiplexer (MUX) is classified into an integer-pixel and a half-pixel according to a half-pixel signal type. An output of MUX is PDAT-CDAT in case of the integer-pixel, while MUX outputs PDAT itself in case of the half-pixel. That is, in case of the half-pixel, MUX outputs PDAT, PDAT+1, or zero.

Figure 1:
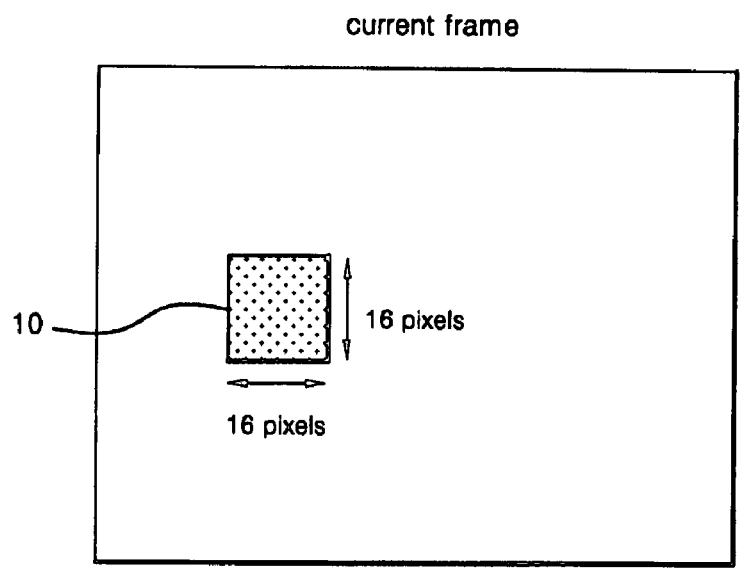
FIG. 1 is a schematic view for illustrating concept of a macro block of a current frame.
Figure 2:
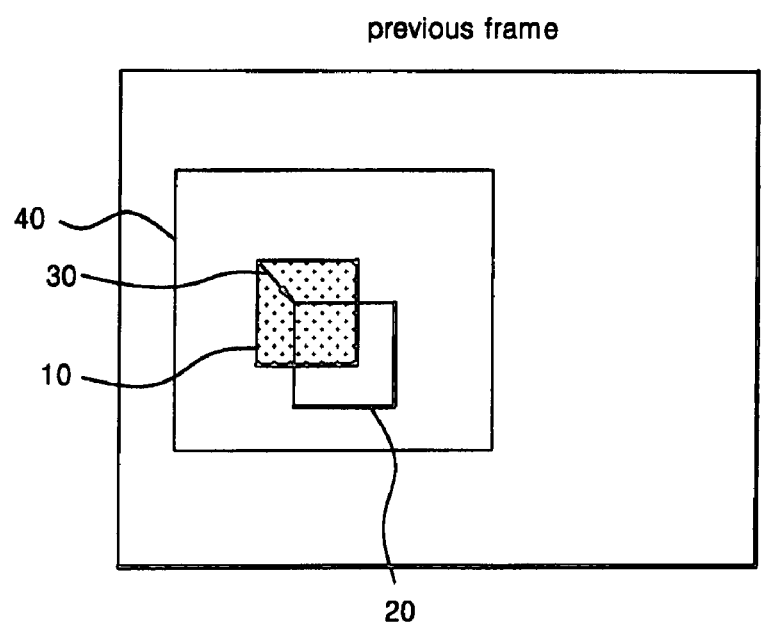
FIG. 2 is a schematic view for illustrating concept of a search window of a previous frame and a motion vector.
Figure 3:
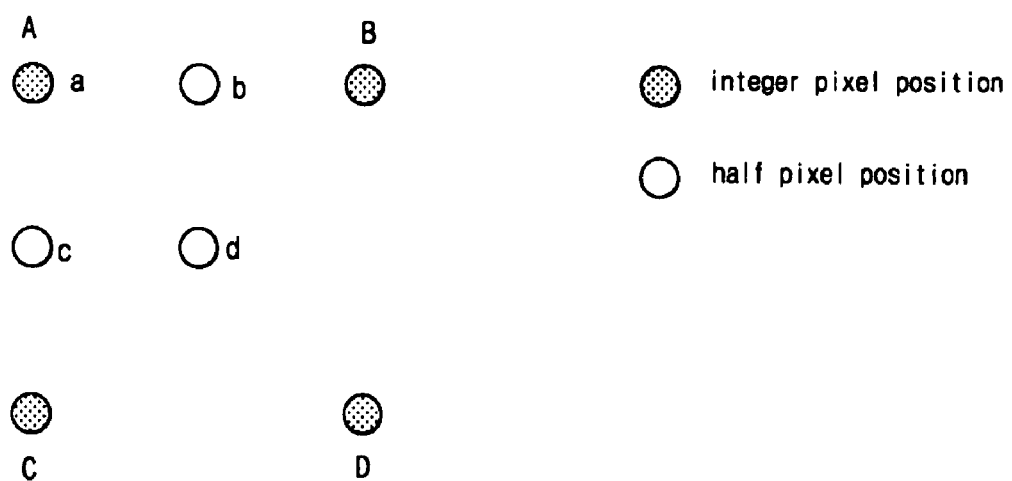
FIG. 3 shows a position of a half-pixel vector of the motion vector in FIG. 2.

It is because the half-pixel type determines the output of MUX. There are 4 types of half-pixels, which correspond to half-pixel position points a, b, c, d shown in FIG. 3.

For example, if the half-pixel type is the point a, the first present processing element (PPE0) 400a outputs only PDAT and the second to fourth present processing elements (PPE1-PPE3) 400b, 400c, 400d output zero, so outputting a half-pixel value at the point a as a differential signal.

If the half-pixel type is the point d, PPE0 (400a) outputs PDAT+1, PPE1 (400b) outputs PDAT1, and PPE2 (400d) outputs PDAT3, or PDAT+1. Such output values are added in the first adder (ADD1) 410 to output the half-pixel value through the scaler 420.

In addition, the MAE values calculated in PE when calculating the motion vector of the integer-pixel are compared in the comparator 500 to find a vector having the least MAE. The comparator 500 operates one time after determining MAE values of 9 vectors by control of the state controller 600.

On the other hand, the sixth to ninth processing elements (PE5, PE6-PE8) shown in FIGS. 9 and 10 have similar structure to PE0-PE4 shown in FIG. 8, and not described here in detail.

In the integer-pixel mode, the processing elements (PE5, PE6-PE8) perform similar operations to PE0-PE4. PE0-PE4 are structurally different from PE5, PE6-PE8 only in the half-pixel mode.

That is, in the half-pixel mode, PE0-PE4 receive 4 pixels to make and send one half-pixel, and PE5 receives 4 pixels in Y-axis having integer-pixels in X-axis to make and send 4 half-pixels.

In addition, PE6-PE8 receive the half-pixels from PE0-PE5 and then calculates a difference from the current pixel data in a similar manner to the integer-pixel mode.

Figure 11:
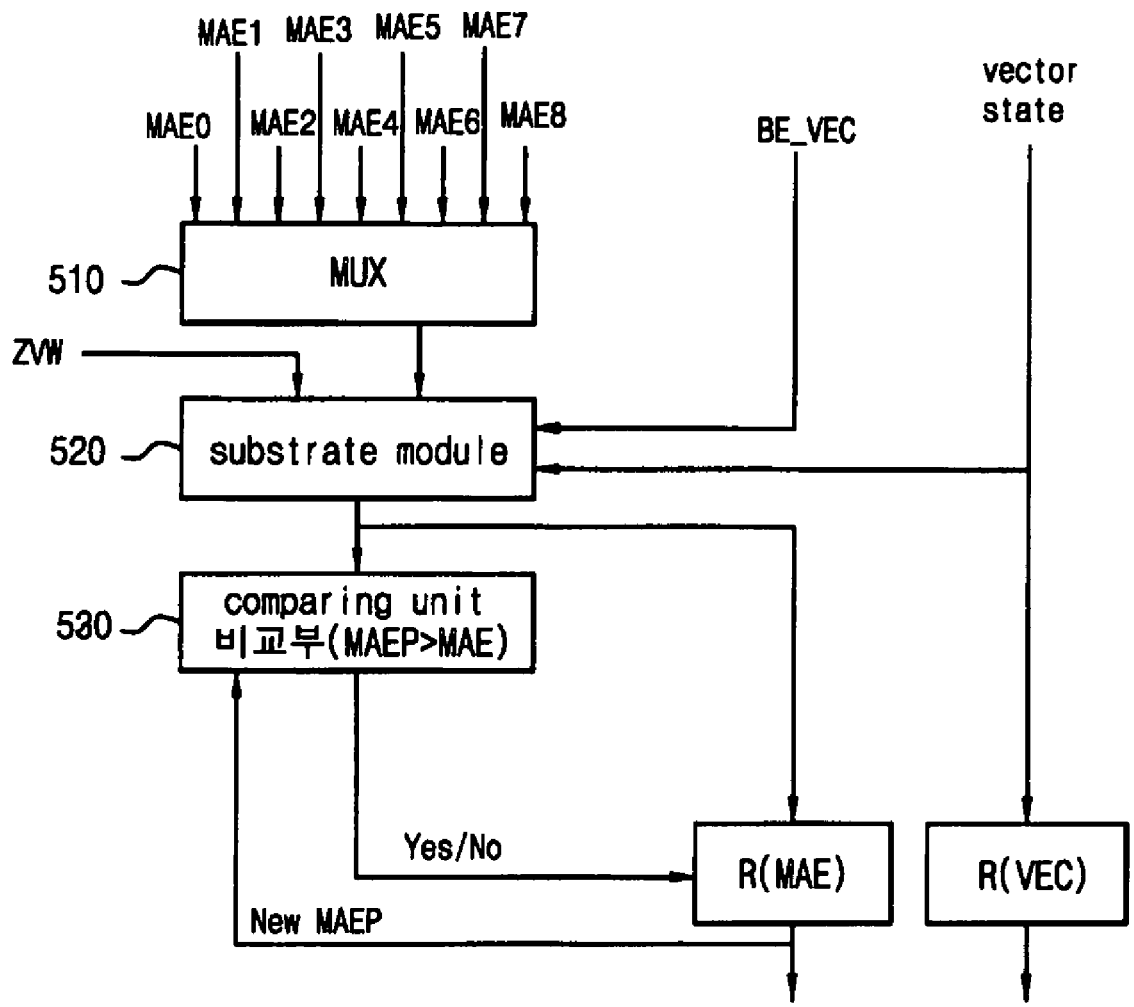
FIG. 11 is a block diagram showing a configuration of a comparator of FIG. 4.

FIG. 11 is a block diagram showing a configuration of the comparator of FIG. 4.

As shown in FIG. 11, the comparator includes a multiplexer (MUX) 510 for multiplexing 9 mean absolute errors (MAE0-MAE8) inputted from the data process unit 400, a substrate module (SUB) 520 for selectively transmitting MAE inputted from the multiplexer 510, and a comparing unit 530 for comparing MAE from the substrate module 520 with a previous MAE (MAEP).

Operations of the comparing unit are described below in more detail.

At first, 9 mean absolute errors (MAE0-MAE8) are selected according to a vector state one by one. The selected MAE is inputted into the substrate module 520, which subtracts a Zero Vector Weight (ZVW) in case of a zero vector.

The reason of subtracting ZVW in case of the zero vector is that it may increase encoding compression efficiency when the vector is 0.

The comparing unit 530 compares MAE with MAEP. If MAE is less than MAEP, MAE is updated as MAEP. That is, a vector at that time is updated as the motion vector.

As described above, the motion estimator architecture for low bit rate image communication has various effects as below.

First, the present invention can be used in low bit rate image communication and is operable in a small memory bandwidth by adopting a previous window memory and a current macro block memory. In addition, the present invention may reduce data access time from an external DRAM to the previous search window memory through a memory address control.

Second, the present may calculate motion vectors of an integer-pixel and a half-pixel with same hardware and improve performance with small hardware as a whole.

Third, the present invention may optimize performance of motion estimation by selectively applying a full search and an interlace search in accordance with image characteristics and encoder performance.

Fourth, the present invention can be applied to an image phone which requires high encoding efficiency due to small hardware and may be applied to all video encoders conforming to H.261/H.263 and MPEG.

The motion estimator architecture for low bit rate image communication according to the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A motion estimator architecture for low bit rate communication comprising:
   previous frame storing means for storing previous search window data of a current macro block from a previous frame memory;
   a current frame storing means for storing current macro block data to find a motion vector in a current frame memory;
   a multiplexer for multiplexing the previous search window data and the current macro block data to conform to data processing thereof;
   data processing means having a plurality of processing elements for calculating a mean absolute error (MAE) of the motion vector based on the previous search window data and the current macro block data transmitted from the multiplexer;
   comparing means for comparatively detecting the MAE of each motion vector from the data processing means to detect a motion vector having a least MAE; and
   state control means for controlling data flow between the above components,
   wherein the motion estimator estimates the motion vector selecting one of a full search method and an interlace search method depending on image characteristics and bit rate.

2. A motion estimator architecture for low bit rate communication comprising:
   previous frame storing means for storing previous search window data of a current macro block from a previous frame memory;
   a current frame storing means for storing current macro block data to find a motion vector in a current frame memory;
   a multiplexer for multiplexing the previous search window data and the current macro block data to conform to data processing thereof;
   data processing means having a plurality of processing elements for calculating a mean absolute error (MAE) of the motion vector based on the previous search window data and the current macro block data transmitted from the multiplexer;

comparing means for comparatively detecting the MAE of each motion vector from the data processing means to detect a motion vector having a least MAE; and state control means for controlling data flow between the above components, wherein the motion estimator estimates a final motion vector by searching −8~+8 integer-pixels to X and Y-axes to obtain an integer-pixel motion vector and then searching 9 half-pixels including the integer-pixel motion vector.

3. The motion estimator architecture for low bit rate image communication as claimed in claim 2, wherein the motion estimator calculates a half-pixel motion vector by searching 9 integer-pixels and 3 half-pixels at the same time using 9 processing elements (PE) when searching the half-pixels.

4. The motion estimator architecture for low bit rate image communication as claimed in claim 2, wherein the motion estimator detects the motion vector by searching both integer-pixels and half-pixels at the same time.

5. A motion estimator architecture for low bit rate communication comprising:

previous frame storing means for storing previous search window data of a current macro block from a previous frame memory;

a current frame storing means for storing current macro block data to find a motion vector in a current frame memory;

a multiplexer for multiplexing the previous search window data and the current macro block data to conform to data processing thereof;

data processing means having a plurality of processing elements for calculating a mean absolute error (MAE) of the motion vector based on the previous search window data and the current macro block data transmitted from the multiplexer;

comparing means for comparatively detecting the MAE of each motion vector from the data processing means to detect a motion vector having a least MAE; and state control means for controlling data flow between the above components, wherein the motion estimator updates data which is not overlapped with the previous search window data when bringing the search window data of the current macro block from the previous frame storing means.

6. The motion estimator architecture for low bit rate image communication as claimed in claim 5, wherein the motion estimator calculates addresses differently depending on that whether a number of the update macro block is even or odd when estimating motion of the current macro block.

* * * * *